(12) United States Patent
Kang et al.

(10) Patent No.: US 7,972,864 B2
(45) Date of Patent: Jul. 5, 2011

(54) METHOD OF MEASURING CONCENTRATION OF FUEL

(75) Inventors: Ku-Yen Kang, Hsinchu (TW); Pei-Fang Huang, Tainan County (TW); Chiou-Chu Lai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/123,478

(22) Filed: May 20, 2008

(65) Prior Publication Data

US 2009/0134879 A1  May 28, 2009

(30) Foreign Application Priority Data

Nov. 27, 2007 (TW) .............................. 96144978 A

(51) Int. Cl.
*G01N 25/18* (2006.01)

(52) U.S. Cl. ............................ 436/149; 436/34; 436/137

(58) Field of Classification Search .................. None
See application file for complete search history.

(56) References Cited

U.S. PATENT DOCUMENTS

| | | | |
|---|---|---|---|
| 6,488,837 B1 | 12/2002 | Ren et al. | |
| 6,589,671 B1 | 7/2003 | Kehrer | |
| 6,589,679 B1 | 7/2003 | Acker et al. | |
| 6,698,278 B2 | 3/2004 | Zhang et al. | |
| 2002/0015868 A1* | 2/2002 | Surampudi et al. | 429/15 |
| 2002/0076589 A1 | 6/2002 | Bostaph et al. | |
| 2003/0196913 A1 | 10/2003 | Xie et al. | |
| 2007/0077469 A1* | 4/2007 | Fukuda et al. | 429/24 |

FOREIGN PATENT DOCUMENTS

| | | |
|---|---|---|
| JP | 2005285628 | 10/2005 |
| TW | I228591 | 3/2005 |
| TW | I282639 | 6/2007 |
| WO | 0135478 | 5/2001 |

OTHER PUBLICATIONS

Wang et al. "A direct methanol fuel cell using acid-doped polybenzimidazole as polymer electrolyte". 1996. Journal of Applied Electrochemistry. vol. 26, pp. 751-756.*

* cited by examiner

*Primary Examiner* — Yelena G Gakh
*Assistant Examiner* — David Weisz
(74) *Attorney, Agent, or Firm* — Jianq Chyun IP Office

(57) ABSTRACT

A method of measuring concentration of a fuel is provided. First, a fuel cell unit having at least an anode, a cathode, and a membrane electrode assembly (MEA) is provided. Next, a fuel is supplied to the anode, while a reactive gas is supplied to the cathode. Then, the amount of the reactive gas supplied to the cathode is adjusted and the concentration of the fuel is estimated in accordance with the consumption rate of the reactive gas in the fuel cell unit.

15 Claims, 6 Drawing Sheets

METHOD OF MEASURING CONCENTRATION OF FUEL

CROSS-REFERENCE TO RELATED APPLICATION

This application claims the priority benefit of Taiwan application serial no. 96144978, filed on Nov. 27, 2007. The entirety of the above-mentioned patent application is hereby incorporated by reference herein and made a part of specification.

BACKGROUND OF THE INVENTION

1. Field of the Invention

The present invention generally relates to a method of measuring a concentration of the fuel, and more particularly a simple and high-accuracy method of measuring the concentration of the fuel.

2. Description of Related Art

With the progress of industry, consumption of traditional energy sources, such as coal, petroleum, and natural gas, are continuously growing. Due to the limited reserves of natural energy, it is necessary to develop new alternative energy sources to replace the traditional energies, and among them, fuel cells are the important and practical one.

In brief, the fuel cells are basically a power generation device that converts chemical energy into electric energy through the inverse reaction of water electrolysis. For example, a proton exchange membrane fuel cell (PEMFC) mainly includes a membrane electrode assembly (MEA) and two electrode plates. The MEA includes a proton exchange membrane, an anode catalyst layer, a cathode catalyst layer, an anode gas diffusion layer (GDL), and a cathode GDL. The anode catalyst layer and the cathode catalyst layer are respectively disposed at two sides of the proton exchange membrane. The anode GDL and the cathode GDL are respectively disposed on the anode catalyst layer and the cathode catalyst layer. Furthermore, the two electrode plates include an anode and a cathode respectively disposed on the anode GDL and the cathode GDL.

Currently, the common proton exchange membrane fuel cell is the direct methanol fuel cell (DMFC), which directly uses a methanol solution as a fuel supply source to generate current through the relevant electrode reaction of methanol and oxygen. The reaction formulae of the direct methanol fuel cells are expressed as follows:

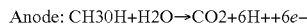

Anode: $CH_3OH+H_2O \rightarrow CO_2+6H^++6e^-$

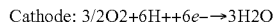

Cathode: $3/2O_2+6H^++6e^- \rightarrow 3H_2O$

During the reaction, the concentration of the methanol solution introduced to the anode has great impact on the stability of the output of the direct methanol fuel cell. If the concentration of the methanol solution introduced to the anode is not properly controlled, disadvantages of poor power generation efficiency and unstable output power may be generated, and further, the MEA may be damaged. Therefore, it has become the important subject in the research and development of the direct methanol fuel cells how to properly supplement methanol so as to control the concentration of the methanol solution introduced into the anode in a suitable range.

The most direct way to control the concentration of the fuel in a fuel cell is to directly measure the concentration of the fuel by a sensor and determine the supplement amount of the fuel and water. This method has been disclosed in TW I228591, U.S. Pat. No. 6,589,671 B1, U.S. Pat. No. 6,488,837, US 2002/076589 A1, US 2003/0196913 A1, WO 01/35478. U.S. Pat. No. 6,488,837 and US 2003/0196913 A1 have disclosed the MEA serving as a sensor for directly measuring the concentration of methanol. It should be noted that the accuracy of the above method is liable to be affected by the impurities in the fuel, aging or unstability of the MEA.

In the prior art, for example, in U.S. Pat. No. 6,698,278 B2, the measured temperature and the current value are brought into an empirical formula to calculate the concentration of the fuel. This method can directly measure the concentration of the fuel without using a sensor. However, this method must be adjusted according to different fuel electrode systems so as to calculate the concentration of the fuel. U.S. Pat. No. 6,589,679 and TW I282639 have also disclosed the methods of directly measuring the concentration of the fuel without using a sensor.

Furthermore, the concentration of the methanol solution is somewhat related to the transmission speed of the sound in the methanol solution, so in some prior arts, the transmission speed of the sound in the methanol solution is used to calculate the concentration of the methanol solution. However, the sensor used in this concentration calculating method is expensive, and when measuring the transmission speed of the sound in the methanol solution, the liquid inside the sensor must be kept still and have no bubbles, which increase the difficulties in the measurement.

In view of the above concentration measuring methods, the problems of difficult measurement, high measurement cost, unstable measurement accuracy exist. Therefore, it is urgent to find a simple and high-accuracy method of measuring concentration of the fuel currently in this field.

SUMMARY OF THE INVENTION

Accordingly, the present invention is directed to a simple, low-cost, and stable method capable of accurately measuring the concentration of a fuel.

The present invention is directed to a method of measuring the concentration of the fuel, which includes the following steps. First, a fuel cell unit having at least an anode, a cathode, and a membrane electrode assembly (MEA) is provided. Next, a fuel is supplied to the anode, while a reactive gas is supplied to the cathode. Then, the amount of the reactive gas supplied to the cathode is adjusted and the concentration of the fuel is estimated in accordance with the consumption rate of the reactive gas in the fuel cell unit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
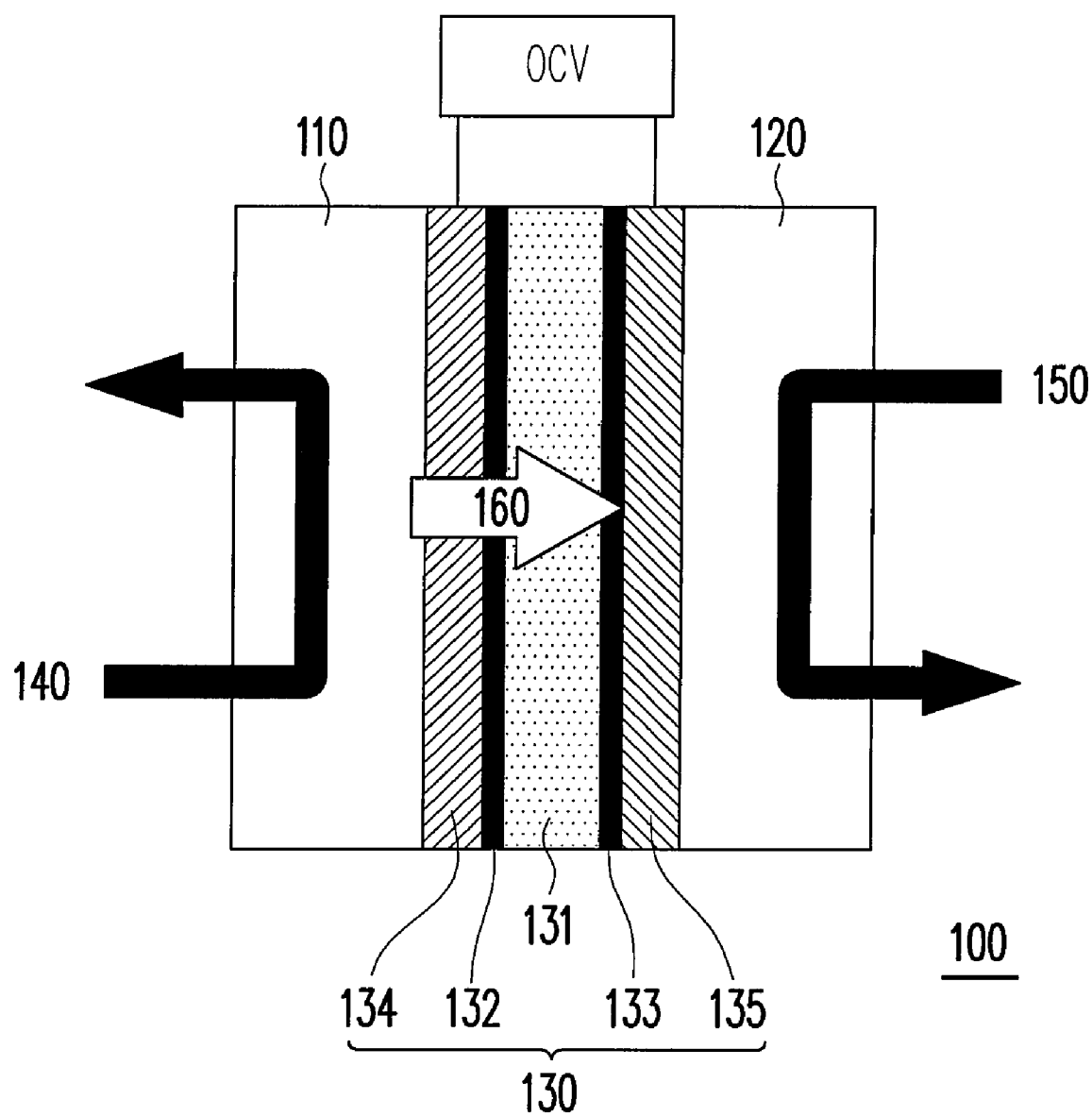
FIGS. 1A and 1B are schematic views of a method of measuring a concentration of a fuel according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
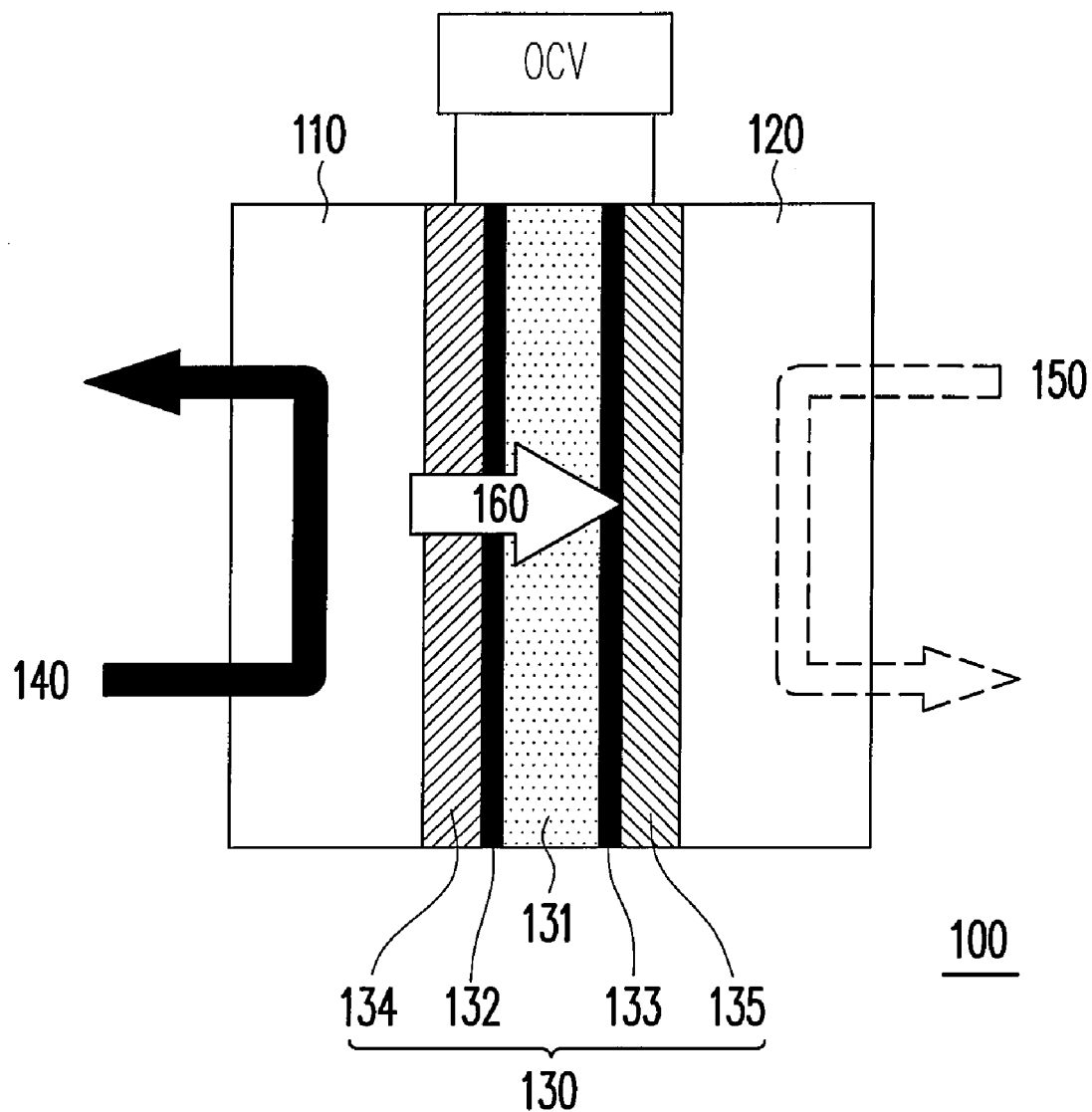

FIGS. 1A and 1B are schematic views of a method of measuring a concentration of a fuel according to a first embodiment of the present invention. Referring to FIG. 1A, first, a fuel cell unit 100 having an anode 110 and a cathode 120 is provided. In this embodiment, the fuel cell unit 100 may be a direct methanol fuel cell unit. In detail, the fuel cell unit 100 at least has a membrane electrode assembly (MEA) 130 between the anode 110 and the cathode 120. The MEA 130 includes, for example, a proton exchange membrane 131, an anode catalyst layer 132, a cathode catalyst layer 133, an anode gas diffusion layer (GDL) 134 and a cathode GDL 135. The anode catalyst layer 132 and the cathode catalyst layer 133 are respectively disposed at two sides of the proton exchange membrane 131, and the anode GDL 134 and the cathode GDL 135 are respectively disposed on the anode catalyst layer 132 and the cathode catalyst layer 133. Definitely, the fuel cell unit 100 in this embodiment may be a fuel cell unit of any form, such as a single cell or the fuel cell stack itself, and those of ordinary skill in the art can select a suitable fuel cell unit according to the actual requirements.

Then, a fuel 140 is supplied to the anode 110 of the fuel cell unit 100, and a reactive gas 150 is supplied to the cathode 120 of the fuel cell unit 100. In this embodiment, the fuel 140 supplied to the anode 110 is, for example, a methanol solution of an uncertain concentration. Definitely, the fuel 140 supplied to the anode 110 may also be another fuels, for example, ethanol solution and formic acid solution, and those of ordinary skill in the art may select a suitable fuel according to the actual requirements. In addition, the reactive gas 150 supplied to the cathode 120 is, for example, air, oxygen, or other suitable gases. When the fuel 140 and the reactive gas 150 are continuously supplied to the fuel cell unit 100, a part of the fuel at the anode 110 reaches the cathode catalyst layer 133 of the MEA 130 by a crossover phenomena (e.g. the crossover fuel 160 shown in FIG. 1A), and is consumed by the combustion reaction with oxygen, and the reaction formula is expressed as follows:

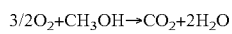

The combustion reaction consumes the oxygen at the cathode 120, and the fuel cell unit 100 maintains a suitable open circuit voltage OCV.

Referring to FIG. 1B, the supply of the reactive gas 150 to the cathode 120 may be reduced or stopped by controlling a gas transmission component or switching a valve in this embodiment. Since the amount of the crossover fuel 160 reaching the cathode 120 is in direct proportion to the concentration of the fuel 140 at the anode 110, the amount of the crossover fuel 140 reaching the cathode 120 directly influences the consumption rate of the reactive gas 150 at the cathode 120. In detail, when the amount of the reactive gas 150 supplied to the cathode 120 is limited, since the reactive gas 150 in the cathode 120 may react with the crossover fuel 160 and be gradually consumed by the combustion reaction, the consumption rate of the reactive gas 150 may be estimated in accordance with the open circuit voltage of the fuel cell unit 100. In this embodiment, when the reactive gas 150 supplied to the cathode 120 is stopped, the reactive gas 150 in the cathode 120 can only allow maintaining the open circuit voltage OCV of the fuel cell unit 100 for a while, and the duration of the time period is closely related to the concentration of the fuel 140. In detail, the higher the concentration of the fuel 140 is, the higher the capability of crossover of the fuel 140 from the anode 110 to the cathode 120 will be, and meanwhile, the consumption rate of the reactive gas 150 is greater. Otherwise, the lower the concentration of the fuel 140 is, the lower the capability of crossover of the fuel 140 from the anode 110 to the cathode 120 will be, and meanwhile, the consumption rate of the reactive gas 150 is lower.

Accordingly, since the concentration of the fuel 140 is related to the consumption rate of the reactive gas 150, the present invention may rapidly calculate the concentration of the fuel 140 in accordance with the consumption rate of the reactive gas 150.

Figure 2:
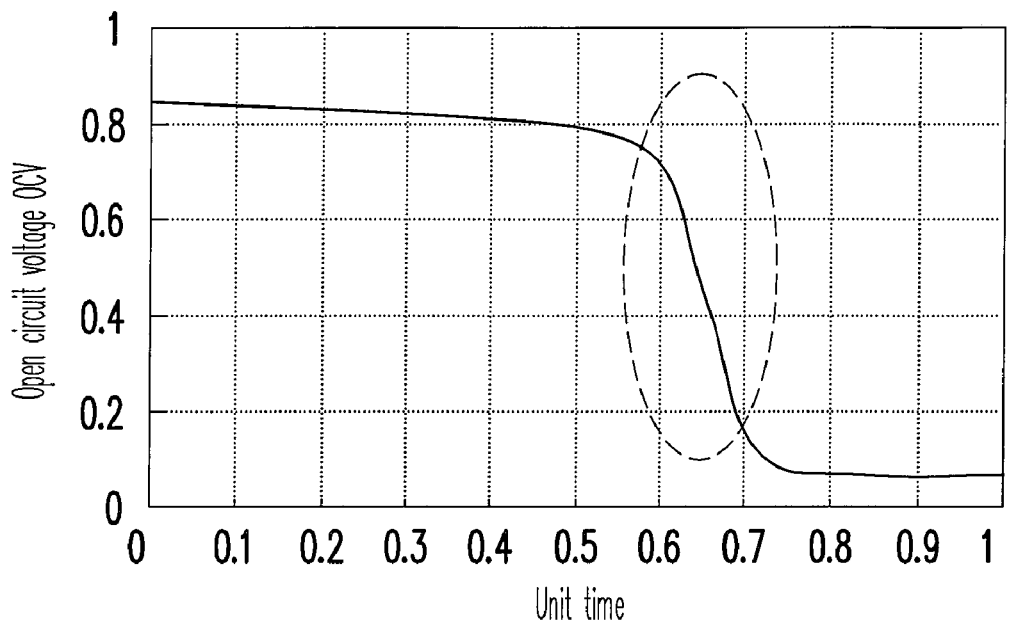
FIG. 2 shows a curve of a relationship between an open circuit voltage output by a fuel cell unit and a time when the supply of the reactive gas is stopped.
Figure 3:
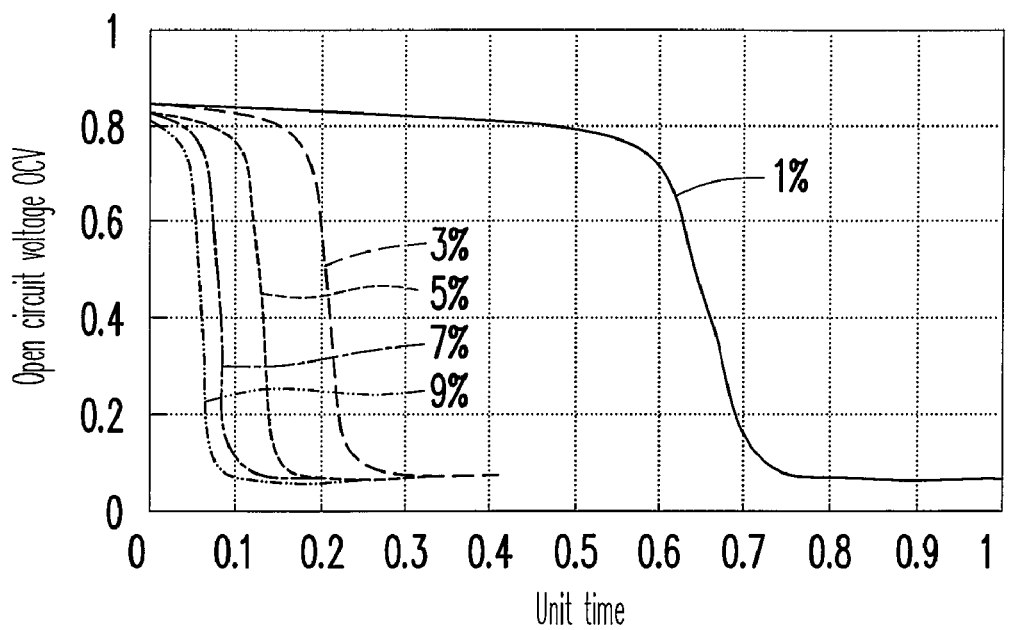
FIG. 3 shows a curve of a relationship between an open circuit voltage output by the fuel cell unit and a time when the supply of the reactive gas is stopped in the case of different fuel concentrations.

FIG. 2 shows a curve of a relationship between an open circuit voltage OCV output by a fuel cell unit 100 and a time when the supply of the reactive gas 150 is stopped, and FIG. 3 shows a curve of a relationship between an open circuit voltage OCV output by the fuel cell unit 100 and a time when the supply of the reactive gas 150 is stopped in the case of different fuel concentrations. This embodiment may estimate the consumption of the reactive gas 150 in accordance with the measured open circuit voltage OCV. In detail, when the reactive gas 150 is exhausted, the open circuit voltage OCV will drop, and the time point at which the open circuit voltage OCV drops may be used to calculate the concentration of the fuel 140.

It would be apparent from FIG. 3 that, when the concentrations of the used methanol solution are 1%, 3%, 5%, 7%, or 9%, the time points at which the open circuit voltage OCV drops are apparently different. In other words, this embodiment may calculate the concentration of the fuel in accordance with the time points at which the open circuit voltage OCV drops. This method has good measurement sensitivity.

In the above embodiment, the time points at which the open circuit voltage drops are used to calculate the concentrations of the fuel. However, the present invention is not limited thereto, and may also calculate the concentration of the fuel in accordance with the speed at which the open circuit voltage drops. In addition, this embodiment may further calculate the concentration of the fuel in accordance with the time period for the open circuit voltage OCV to drop to a certain value. As shown in FIG. 3, the higher the concentration of the methanol solution is, the shorter the time period for the open circuit voltage OCV to drop to a certain value will be. Otherwise, the lower the concentration of the methanol solution is, the longer the time period for the open circuit voltage OCV to drop to a certain value will be. It should be noted that this embodiment may enlarge the time period for the open circuit voltage OCV to drop to the certain value corresponding to different concentrations of the fuel by controlling the amount of the introduced reactive gas, thus achieving an easier estimation of the concentration of the fuel.

It should be noted that the fuel cell unit 100 of the embodiment may be directly used as a fuel concentration sensor and may also be connected in a fuel circulation loop of a fuel cell system. The fuel concentration sensor when installed does not need to be connected in branch, and the fuel concentration sensor when operated will not affect the operation of the fuel cell system. In detail, since the present invention utilizes the fuel cell unit 100 to measure the concentration of the fuel, the present invention may use one or more fuel cell units in the fuel cell module as the fuel concentration sensor to measure the concentration of the fuel directly. At this time, the fuel cell module does not need an additional fuel concentration sensor.

Figure 4A:
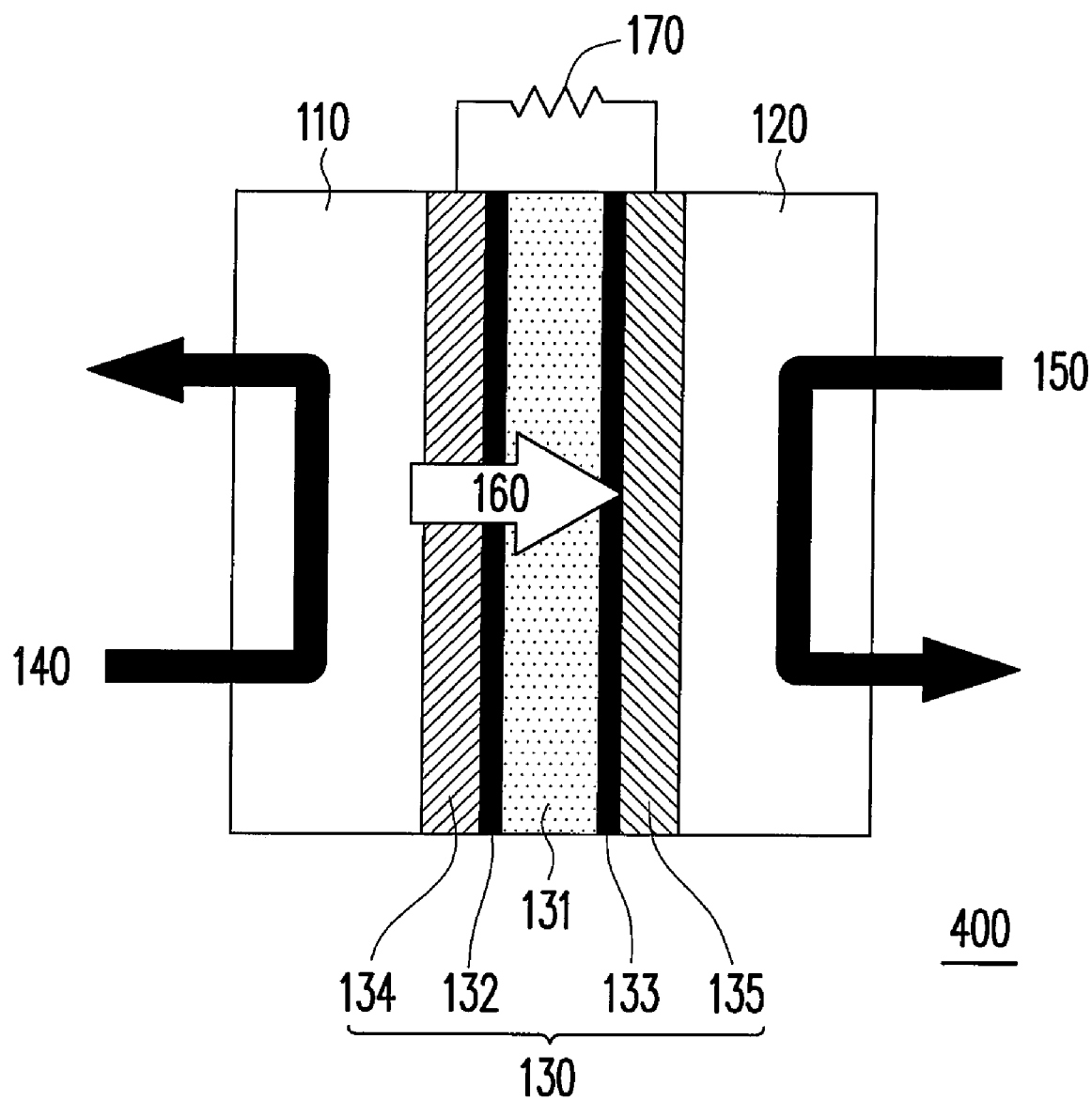
FIGS. 4A and 4B are schematic views of a method of measuring a concentration of a fuel according to a second embodiment of the present invention.
Figure 4B:
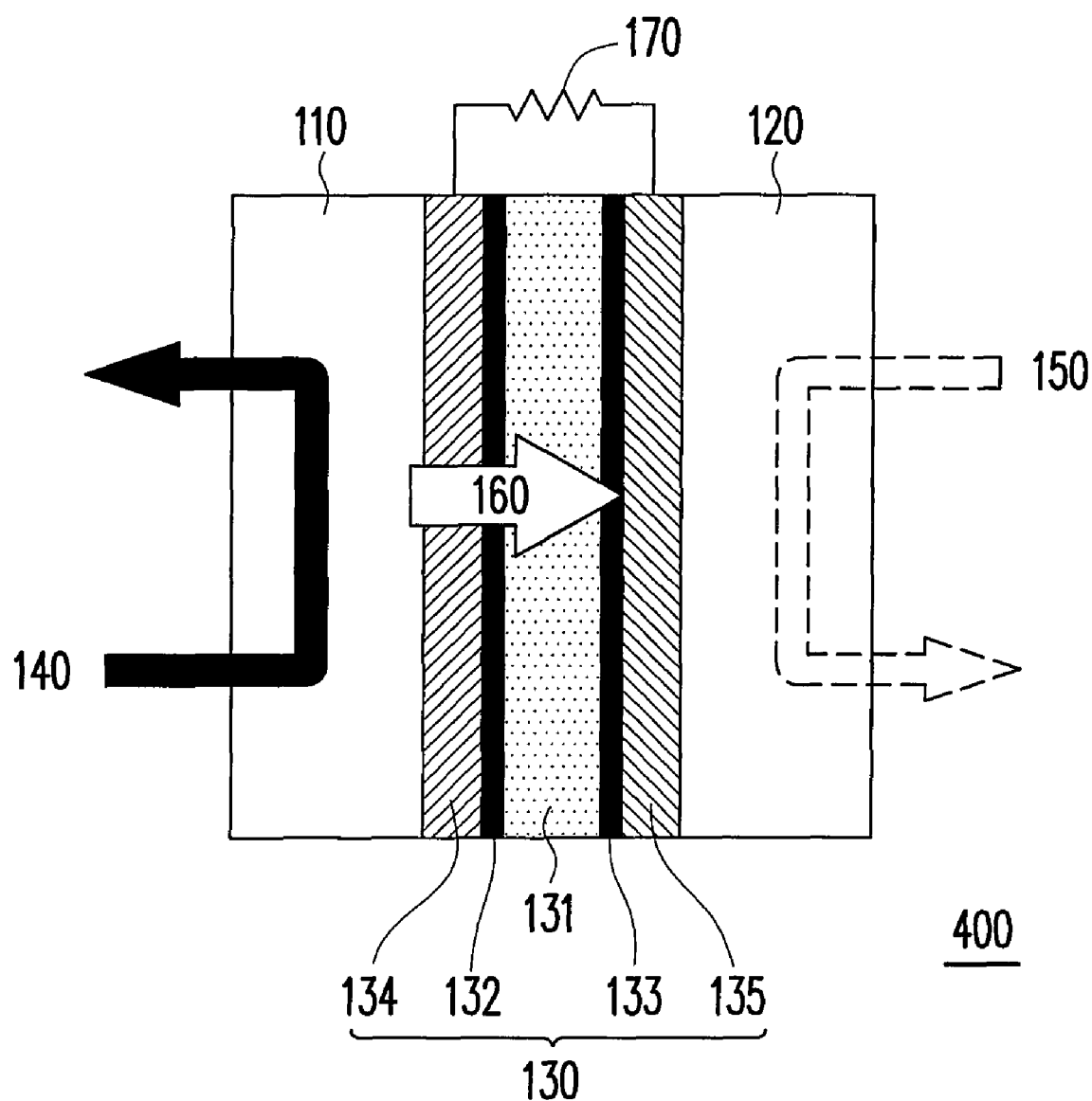

FIGS. 4A and 4B are schematic views of a method of measuring a concentration of a fuel according to a second embodiment of the present invention. Referring to FIG. 4A, a fuel cell unit 400 of this embodiment is similar to the fuel cell unit 100 of the first embodiment except that the fuel cell unit 400 in FIG. 4A outputs the electric energy to an external load 170 directly.

Referring to FIG. 4B, the fuel cell unit 400 may reduce or stop the supply of the reactive gas 150 to the cathode 120 by controlling a gas transmission component or switching a valve (not shown). When the amount of the reactive gas 150 supplied to the cathode 120 is limited, the reactive gas 150 in the cathode 120 is consumed by the reduction reaction of the fuel cell unit 400 and the combustion reaction with the crossover fuel 160. Since the amount of the crossover fuel 160 is in direct proportion to the concentration of the fuel 140 at the anode 110, the concentration of the fuel 140 may be calculated in accordance with the consumption rate of the reactive gas 150.

Figure 5:
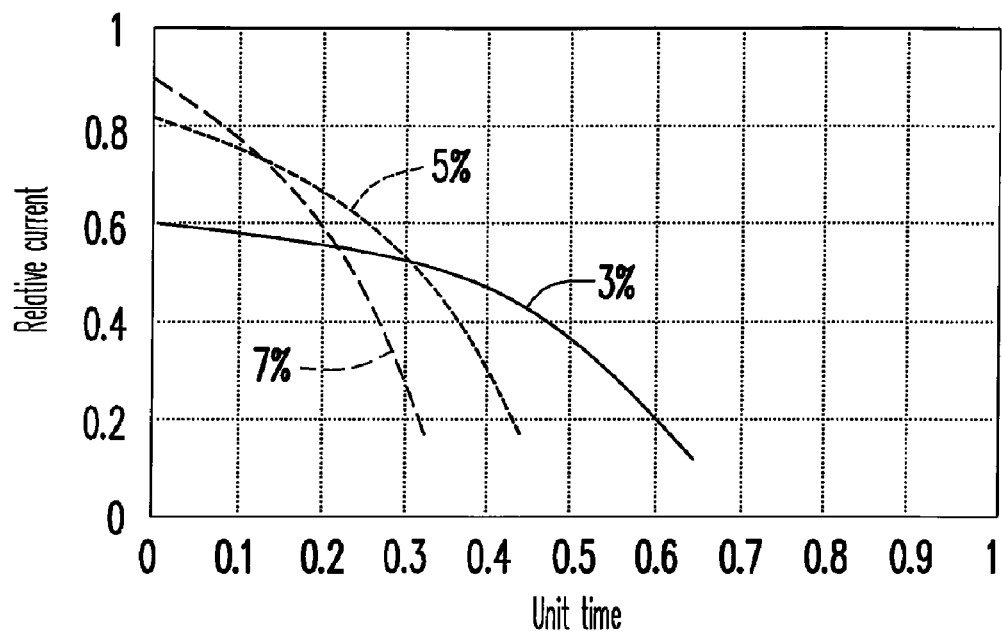
FIG. 5 shows a curve of a relationship between a current of a fuel cell unit outputting electric energy under a constant voltage and a time when the supply of the reactive gas is stopped in the case of different fuel concentrations.
Figure 6:
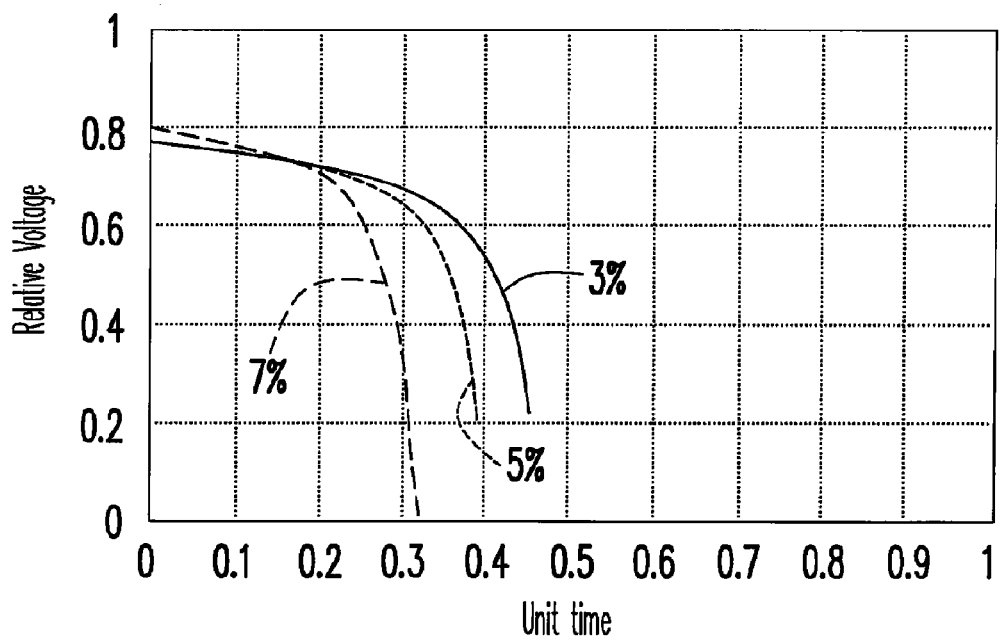
FIG. 6 shows a curve of a relationship between a voltage of a fuel cell unit outputting electric energy under a constant current and time ceasing the supply of the reactive gas at different fuel concentrations.

FIG. 5 shows a curve of a relationship between a current of a fuel cell unit outputting electric energy at a constant voltage and a time when the supply of the reactive gas is stopped in the case of different fuel concentrations. FIG. 6 shows a curve of a relationship between a voltage of a fuel cell unit outputting electric energy at a constant current and a time when the supply of the reactive gas is stopped in the case of different fuel concentrations. It would be apparent from FIGS. 5 and 6 that the measurement observer may rapidly calculate the concentration of the fuel 140 in accordance with the voltage variation rate or the current variation rate.

Referring to FIG. 5 again, based on the current-time curve in FIG. 5, the measurement observer may calculate the concentration of the fuel in accordance with the time period for the current to drop to a certain value. In detail, the higher the concentration of the fuel is, the shorter the time period for the current to drop to a certain value will be. Otherwise, the lower the concentration of the fuel is, the longer the time period for the current to drop to a certain value will be. In other embodiments, the measurement observer may also calculate the concentration of the fuel in accordance with the drop amount of the current in a specific time. In detail, the higher the concentration of the fuel is, the greater the drop amount of the current in a specific time will be. Otherwise, the lower the concentration of the fuel is, the less the drop amount of the current in a specific time will be.

Referring to FIG. 6, based on each voltage-time curve in FIG. 6, the measurement observer may calculate the concentration of the fuel in accordance with the time period for the voltage to drop to a certain value. In detail, the higher the concentration of the fuel is, the shorter the time period for the voltage to drop to a certain value will be. Otherwise, the lower the concentration of the fuel is, the longer the time period for the voltage to drop to a certain value will be. In other embodiments, the measurement observer may also calculate the concentration of the fuel in accordance with the drop amount of the voltage in a specific time. In detail, the higher the concentration of the fuel is, the greater the drop amount of the voltage in a specific time will be. Otherwise, the lower the concentration of the fuel is, the less the drop amount of the voltage in a specific time will be.

Accordingly, in the measurement methods in FIGS. 5 and 6, the concentration of the fuel may be easily estimated by controlling the introduced reactive gas.

In view of the above, as the present invention may estimate the concentration of the fuel in accordance with the consumption rate of the reactive gas at the cathode, the method of measuring a concentration of a fuel of the present invention is simple and accurate. Furthermore, the method of measuring a concentration of a fuel of the present invention has a high stability and will not be easily affected by the flow of the fuel and the bubbles in the fuel. Especially, one can just use operational fuel cell stack in the system to measure the fuel concentration.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of measuring concentration of a fuel, comprising:
    providing a fuel cell unit comprising at least an anode, a cathode, and a membrane electrode assembly (MEA);
    establishing at least one open circuit voltage vs, time curve corresponding to at least one known concentration of a fuel, wherein the method of establishing the at least one open circuit voltage vs, time curve comprises:
        (a) supplying the fuel having one known concentration to the anode;
        (b) supplying a reactive gas to the cathode;
        (c) stopping supplying the reactive gas to the cathode and measuring open circuit voltage of the MEA so as to obtain one open circuit voltage vs, time curve thus considerably reducing a measurement time;
    (a)' supplying the fuel having an unknown concentration to the anode;
    (b)' supplying the reactive gas to the cathode;
    (c)' stopping supplying the reactive gas to the cathode and measuring open circuit voltage of the MEA so as to obtain a new open circuit voltage vs, time curve; and
    comparing the new open circuit voltage vs, time curve with the at least one open circuit voltage vs, time curve, so to estimate the concentration of the fuel having the unknown concentration.

2. The method as claimed in claim 1, wherein the concentration of the fuel having the unknown concentration is estimated in accordance with a time point at which the open circuit voltage drops.

3. The method as claimed in claim 1, wherein the concentration of the fuel having the unknown concentration is estimated in accordance with a time period for the open circuit voltage to drop to a certain value.

4. The method as claimed in claim 1, wherein the concentration of the fuel having the unknown concentration is estimated in accordance with a speed at which the open circuit voltage drops.

5. A method of measuring concentration of a fuel, comprising:
    providing a fuel cell unit comprising at least an anode, a cathode, and a membrane electrode assembly (MEA);
    establishing at least one output current vs, time curve corresponding to at least one known concentration of a fuel, wherein the method of establishing the at least one output current vs, time curve comprises:
  (a) supplying the fuel having one known concentration to the anode;
  (b) supplying a reactive gas to the cathode;
  (c) stopping supplying the reactive gas to the cathode and measuring output current of the MEA so as to obtain one output current vs, time curve thus considerably reducing a measurement time;
  (a)' supplying the fuel having an unknown concentration to the anode;
  (b)' supplying the reactive gas to the cathode;
  (c)' stopping supplying the reactive gas to the cathode and measuring output current of the MEA so as to obtain a new output current vs, time curve; and
  comparing the new output current vs, time curve with the at least one output current vs, time curve, so to estimate the concentration of the fuel having the unknown concentration.

6. The method as claimed in claim 5, wherein the concentration of the fuel having the unknown concentration is estimated in accordance with a time point at which the output current drops.

7. The method as claimed in claim 5, wherein the concentration of the fuel having the unknown concentration is estimated in accordance with a time period for the output current to drop to a certain value.

8. The method as claimed in claim 5, wherein the concentration of the fuel having the unknown concentration is estimated in accordance with a speed at which the output current drops.

9. A method of measuring concentration of a fuel, comprising:
  providing a fuel cell unit comprising at least an anode, a cathode, and a membrane electrode assembly (MEA);
  establishing at least one output voltage vs, time curve corresponding to at least one known concentration of a fuel, wherein the method of establishing the at least one output voltage vs, time curve comprises:
    (a) supplying the fuel having one known concentration to the anode;
    (b) supplying a reactive gas to the cathode;
    (c) stopping supplying the reactive gas to the cathode and measuring output voltage of the MEA so as to obtain one output voltage vs, time curve thus considerably reducing a measurement time;
  (a)' supplying the fuel having an unknown concentration to the anode;
  (b)' supplying the reactive gas to the cathode;
  (c)' stopping supplying the reactive gas to the cathode and measuring output voltage of the MEA so as to obtain a new output voltage vs, time curve; and
  comparing the new output voltage vs, time curve with the at least one output voltage vs, time curve, so to estimate the concentration of the fuel having the unknown concentration.

10. The method as claimed in claim 9, wherein the concentration of the fuel having the unknown concentration is estimated in accordance with a time point at which the output voltage drops.

11. The method as claimed in claim 9, wherein the concentration of the fuel having the unknown concentration is estimated in accordance with a time period for the output voltage to drop to a certain value.

12. The method as claimed in claim 9, wherein the concentration of the fuel having the unknown concentration is estimated in accordance with a speed at which the output voltage drops.

13. The method as claimed in claim 1, wherein the fuel cell unit comprises a direct methanol fuel cell unit.

14. The method as claimed in claim 1, wherein the reactive gas comprises air or oxygen.

15. The method as claimed in claim 1, wherein the fuel comprises a methanol solution, an ethanol solution, or a formic acid solution.

* * * * *